United States Patent
Nishio et al.

(10) Patent No.: US 7,796,938 B2
(45) Date of Patent: Sep. 14, 2010

(54) WIRELESS TRANSMITTER AND METHOD THAT SELECT A SUBCARRIER BASED ON SUBCARRIER RECEPTION QUALITY INFORMATION

(75) Inventors: Akihiko Nishio, Kanagawa (JP); Kenichi Miyoshi, Kanagawa (JP); Isamu Yoshii, Kanagawa (JP)

(73) Assignee: Panasonic Corporation, Osaka (JP)

( * ) Notice: Subject to any disclaimer, the term of this patent is extended or adjusted under 35 U.S.C. 154(b) by 862 days.

(21) Appl. No.: 11/658,573

(22) PCT Filed: Jul. 7, 2005

(86) PCT No.: PCT/JP2005/012613

§ 371 (c)(1), (2), (4) Date: Jan. 26, 2007

(87) PCT Pub. No.: WO2006/011347

PCT Pub. Date: Feb. 2, 2006

(65) Prior Publication Data
US 2009/0005109 A1    Jan. 1, 2009

(30) Foreign Application Priority Data
Jul. 30, 2004    (JP) .............................. 2004-224764

(51) Int. Cl.
*H04H 20/71* (2008.01)
*H04H 60/09* (2008.01)
*H04B 1/00* (2006.01)
*H04B 7/00* (2006.01)
*H04W 4/00* (2009.01)

(52) U.S. Cl. ....................... 455/3.01; 455/3.04; 455/69; 455/509; 455/513; 455/522; 370/312; 370/329; 370/332

(58) Field of Classification Search ................. 370/312, 370/329, 332; 455/3.01, 13.4, 69, 509, 513, 455/522, 3.04
See application file for complete search history.

(56) References Cited

U.S. PATENT DOCUMENTS 5,574,983 A  *  11/1996  Douzono et al. .............. 455/69
5,848,358 A       12/1998  Forssén (Continued)

FOREIGN PATENT DOCUMENTS

JP        2002051006        2/2002

(Continued)

OTHER PUBLICATIONS

Russian Office Action dated Mar. 31, 2009 with English translation.

(Continued)

*Primary Examiner*—Dwayne D Bost
*Assistant Examiner*—Larry Sternbane
(74) *Attorney, Agent, or Firm*—Dickinson Wright PLLC

(57) ABSTRACT

A radio transmission apparatus and method for multicasting or broadcasting common data to a plurality of radio receiving apparatuses. The apparatus and method acquire per-subcarrier reception quality information from a radio receiving apparatus. A subcarrier is selected for the multicasting or broadcasting among a plurality of subcarriers, each of which has a different frequency, based on the acquired per-subcarrier reception quality information. And the transmission power of the selected subcarrier is controlled.

21 Claims, 12 Drawing Sheets

U.S. PATENT DOCUMENTS

| | | | |
|---|---|---|---|
| 5,956,642 A * | 9/1999 | Larsson et al. | 455/449 |
| 6,263,205 B1 * | 7/2001 | Yamaura et al. | 455/442 |
| 6,819,909 B1 * | 11/2004 | Hiramatsu | 455/69 |
| 7,012,912 B2 * | 3/2006 | Naguib et al. | 370/343 |
| 7,286,609 B2 * | 10/2007 | Maltsev et al. | 375/267 |
| 2001/0007552 A1 | 7/2001 | Schiff | |
| 2002/0160798 A1 * | 10/2002 | Shoji et al. | 455/522 |
| 2003/0087644 A1 * | 5/2003 | Miyoshi et al. | 455/452 |
| 2004/0132456 A1 | 7/2004 | Takeda et al. | |
| 2004/0266447 A1 * | 12/2004 | Terry | 455/450 |
| 2005/0099975 A1 * | 5/2005 | Catreux et al. | 370/329 |
| 2005/0201295 A1 * | 9/2005 | Kim et al. | 370/241 |

FOREIGN PATENT DOCUMENTS

| | | |
|---|---|---|
| JP | 2004064723 | 2/2004 |
| JP | 2004128563 | 4/2004 |
| RU | 2 150 788 | 6/2000 |
| RU | 2 180 159 | 2/2002 |

OTHER PUBLICATIONS

J. Spilker, "Digital Communications By Satellite," Prentice-Hall, Inc., 1979, pp. 196-203.

K. Feher, "Wireless Digital Communications, Modulation and Spread Spectrum Applications," Prentice-Hall PTR, 2000, pp. 324-327, 332-333.

International Search Report dated Aug. 23, 2005.

3GPP TS 22.146 v6.0.0, Technical Specification, 3$^{rd}$ Generation Partnership Project Technical Specification Group Services and System Aspects, Multimedia Broadcast/Multicast Service, Stage 1 (Release 6), www.3gpp.org, Valbonne, France, 15 pages total, Jun. 2002.

J. Spilker, "Digital Communications by Satellite," Prentice-Hall, Inc., 1979, pp. 196-203. (partial English translation).

K. Feher, "Wireless Digital Communications, Modulation and Spread Spectrum Applications," Prentice-Hall PTR, 2000, pp. 324-327, 332-333. (partial English translation).

* cited by examiner

| SUBCARRIER | #1 | #2 | #3 | #4 | #5 | #6 |
|---|---|---|---|---|---|---|
| MS150b | 3dB | 2dB | -5dB | 2dB | 8dB | -3dB |
| MS150d | -1dB | 4dB | 6dB | 3dB | 4dB | -5dB |
| MS150e | -3dB | 3dB | 0dB | -4dB | -5dB | 5dB |

FIG.4

WIRELESS TRANSMITTER AND METHOD THAT SELECT A SUBCARRIER BASED ON SUBCARRIER RECEPTION QUALITY INFORMATION

TECHNICAL FIELD

The present invention relates to a radio transmission apparatus and a radio transmission method, and more particularly, to a radio transmission apparatus and a radio transmission method used for multicasting or broadcasting in a mobile communication system.

BACKGROUND ART

In the field of a mobile communication, technological studies have been carried out on Multimedia Broadcast Multicast Service (hereinafter referred to as "MBMS") (for example, see non-patent document 1). A communication carried out in the MBMS is not a point to point (P-to-P) communication, but a point to multi (P-to-M) communication. An example of the point to point communication includes, for example, unicasting, and an example of the point to multi communication includes, for example, multicasting and broadcasting. That is, with the MBMS, one transmission apparatus delivers data of the same contents (for example, music data and a TV program) to a plurality of receiving apparatuses.

A physical channel (hereinafter, simply referred to as a "channel") used when a radio signal is transmitted between a radio transmission apparatus (for example, a base station apparatus) and a radio receiving apparatus (for example, a mobile station apparatus) in a mobile communication system including, for example, a cellular system is one of two major channels—that is, dedicated physical channel (hereinafter, simply referred to as "dedicated channel") and common physical channel (hereinafter, simply referred to as "common channel"). Of these channels, when radio transmission using a common channel is carried out, transmission power is set to a predetermined level.

With a conventional radio transmission apparatus and radio transmission method used for providing the MBMS, multicasting and broadcasting may be carried out using a common channel among these channels.

Non-Patent Document 1: 3GPP TS 22.146 V6.0.0 (2002-06): 3rd Generation Partnership Project; Technical Specification Group Services and System Aspects; Multimedia Broadcast/Multicast Service; Stage 1 (Release 6) June, 2002

DISCLOSURE OF INVENTION

Problems to be Solved by the Invention

However, with the above conventional radio transmission apparatus and radio transmission method, it is necessary to secure reception quality of a certain level or higher at a radio receiving apparatus (i.e., the target receiver) to surely deliver data to the radio receiving apparatus (i.e., the target receiver) among radio receiving apparatuses located in a cell.

In order to implement this, suppose that transmission power of a common channel is increased beforehand so that the reception quality (for example, reception error rate characteristics) of all radio receiving apparatuses in the cell are higher than a certain level. In this case, interference against other cells increases and the system capacity decreases. Furthermore, in general, the transmission power available in a radio transmission apparatus is limited, and, if the transmission power of a common channel is increased, the capacity of a dedicated channel used for carrying out, for example, a voice communication also decreases.

It is therefore an object of the present invention to provide a radio transmission apparatus and a radio transmission method that are able to increase system capacity or dedicated channel capacity, and surely deliver data to a radio receiving apparatus (i.e., the target receiver) of multicasting or broadcasting.

Means for Solving the Problem

A radio transmission apparatus of the present invention for carrying out multicasting or broadcasting of data for a plurality of radio receiving apparatuses using common physical channels, adopts a configuration having: an acquisition section that acquires reception quality information of each of the plurality of radio receiving apparatuses; a setting section that sets a subchannel used for multicasting or broadcasting of the data in a switchable manner among a plurality of subchannels of the common physical channels based on the acquired reception quality information; and a control section that controls transmission power of the set subchannel.

A radio transmission method of the present invention in a radio transmission apparatus carrying out multicasting or broadcasting of data for a plurality of radio receiving apparatuses using common physical channels, has: an acquisition step of acquiring reception quality information of each of the plurality of radio receiving apparatuses; a setting step of setting subchannels used for multicasting or broadcasting the data in a switchable manner among the plurality of subchannels of the common physical channels based on the acquired reception quality information; and a control step of controlling transmission power of the set subchannels.

Advantageous Effect of the Invention

According to the present invention, it is possible to increase a system capacity or dedicated channel capacity and, moreover, surely deliver data to a radio receiving apparatus (i.e., the target receiver) of multicasting or broadcasting.

BRIEF DESCRIPTION OF DRAWINGS

FIG. 4 is a diagram illustrating per-subcarrier quality information according to Embodiment 1 of the present invention;

BEST MODE FOR CARRYING OUT THE INVENTION

Now, embodiments of the present invention will be explained in detail with reference to the attached drawings.

Embodiment 1

Figure 1:
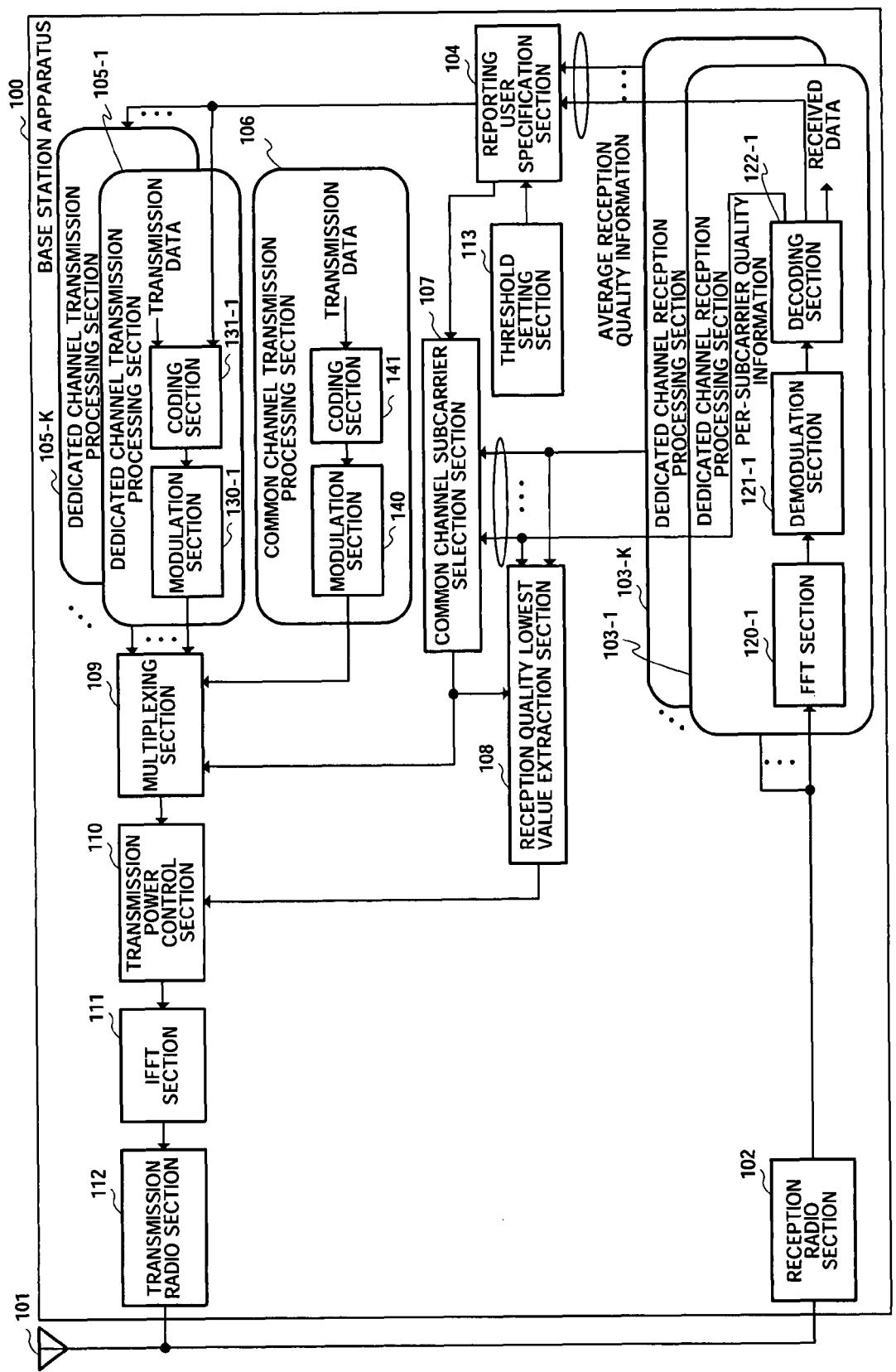
FIG. 1 is a block diagram showing the configuration of a base station apparatus according to Embodiment 1 of the present invention.
Figure 2:
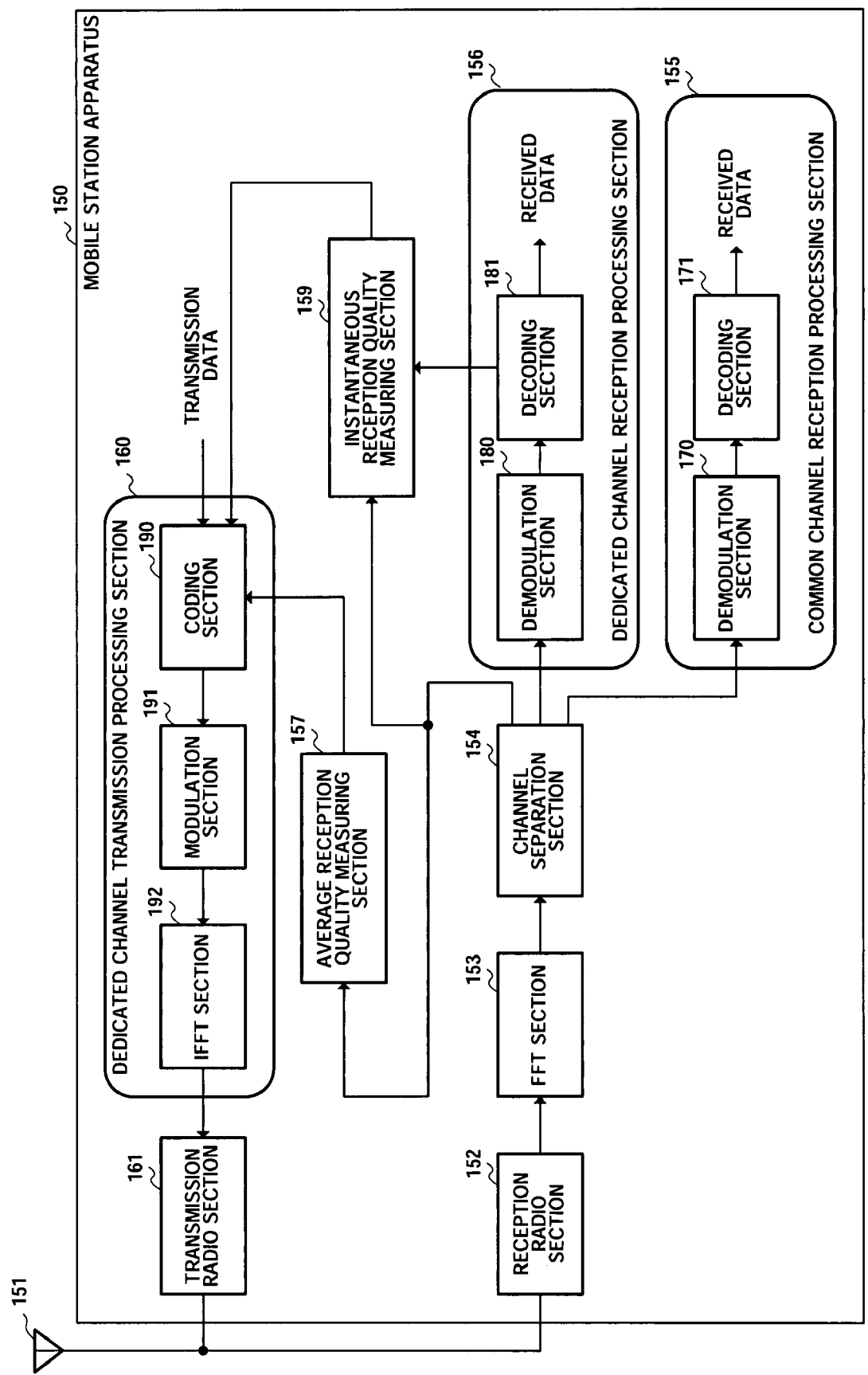
FIG. 2 is a block diagram showing the configuration of a mobile station apparatus according to Embodiment 1 of the present invention.

FIG. 1 is a block diagram showing the configuration of a base station apparatus according to Embodiment 1 of the present invention, and FIG. 2 is a block diagram showing the configuration of a mobile station apparatus which carries out a radio communication with this base station apparatus. Base station apparatus 100 shown in FIG. 1 and mobile station apparatus 150 shown in FIG. 2 each adopt the OFDM (Orthogonal Frequency Division Multiplexing) scheme.

Base station apparatus 100 has antenna 101; reception radio section 102; K (K is an integer of 2 or greater) dedicated channel reception processing sections 103-1, . . . , and 103-K; reporting user specification section 104; K dedicated channel transmission processing sections 105-1, . . . , and 105-K; common channel transmission processing section 106; common channel subcarrier selection section 107; reception quality lowest value extraction section 108; multiplexing section 109; transmission power control section 110; IFFT (Inverse Fast Fourier Transform) section 111; transmission radio section 112; and threshold setting section 113.

Furthermore, dedicated channel reception processing section 103-1 has FFT (Fast Fourier Transform) section 120-1; demodulation section 121-1; and decoding section 122-1. Dedicated channel reception processing sections 103-1 to 103-K have the same internal configuration, an arbitrary one of reception processing sections 103-1 to 103-K will be referred to as "dedicated channel reception processing section 103" in the explanations below. Furthermore, the internal configuration of dedicated channel reception processing section 103 will be abbreviated to FFT section 120, demodulation section 121 and decoding section 122, respectively.

Furthermore, dedicated channel transmission processing section 105-1 has modulation section 130-1 and coding section 131-1. Dedicated channel transmission processing sections 105-1 to 105-K have the same internal configuration, and so an arbitrary one of dedicated channel transmission processing sections 105-1 to 105-K will be referred to as "dedicated channel transmission processing section 105" in the explanations below. Furthermore, the internal configuration of dedicated channel transmission processing section 105 will be abbreviated to modulation section 130 and coding section 131, respectively.

Furthermore, common channel transmission processing section 106 has modulation section 140 and coding section 141.

Reception radio section 102 performs predetermined reception processing including, for example, down-conversion and A/D conversion to a radio signal received through antenna 101 and obtains a baseband signal.

When a plurality of mobile station apparatuses 150 shown in FIG. 2 exist, each dedicated channel reception processing section 103 corresponds to one of mobile station apparatuses 150. Furthermore, dedicated channel reception processing section 103 as an acquisition section acquires reception quality information of each radio receiving apparatus 150.

More specifically, in dedicated channel reception processing section 103, FFT section 120 performs an FFT on an output signal of reception radio section 102, and demodulation section 121 performs demodulation processing on the signal subjected to FFT, and, in this way, the signal received through a dedicated channel from corresponding mobile station apparatus 150 is obtained.

Decoding section 122 obtains received data and reception quality information by decoding the signal obtained through the demodulation processing. The reception quality information is information reported from corresponding mobile station apparatus 150 and contains information indicating average reception quality of N (N is an integer of 2 or greater) subcarriers (hereinafter referred to as "average reception quality information") and information indicating instantaneous reception quality on a per subcarrier basis (hereinafter referred to as "per-subcarrier quality information"). When average reception quality information is obtained, the average reception quality information is output to reporting user specification section 104. When per-subcarrier quality information is obtained, the per-subcarrier quality information is output to common channel subcarrier selection section 107 and reception quality lowest value extraction section 108. The average reception quality and the instantaneous reception quality per subcarrier will be described later.

Reporting user specification section 104 specifies mobile station apparatus 150 reporting per-subcarrier quality information from mobile station apparatuses 150 (i.e., the target receivers) based on the average reception quality information reported from the target receivers of multicast data and broadcast data among the input average reception quality information.

More specifically, reporting user specification section 104 compares the average reception quality indicated in the average reception quality information with a report determination threshold input from threshold setting section 113, and specifies mobile station apparatuses 150 having average reception quality equal to or lower than the report determination threshold among mobile station apparatuses 150 (i.e., the target receivers). By determinating whether or not the average reception quality is equal to or lower than the report determination threshold, reporting user specification section 104 identifies mobile station apparatus 150 in a poor reception environment—for example, a mobile station apparatus located near a cell boundary—from mobile station apparatuses 150 (i.e., the target receivers). Mobile station apparatuses 150 are identified in this way. The specification result is reported to common channel subcarrier selection section 107.

In this way, mobile station apparatus 150 having average reception quality of a predetermined level (that is, report determination threshold) or below is identified, so that it is possible to select a subcarrier based on the per-subcarrier quality information of mobile station apparatus 150 for which sure data delivery is relatively difficult due to the reception environment, and surely prevent failure in data delivery. Furthermore, mobile station apparatus 150 located near the cell boundary is identified, so that it is possible to select a subcarrier based on the per-subcarrier quality information of mobile station apparatus 150 for which sure data delivery is relatively difficult due to the geographical position, and surely prevent failure in data delivery.

Although with this embodiment it is presupposed that all mobile station apparatuses 150 carrying out radio communication with base station apparatus 100 periodically report average reception quality information, mobile station apparatus 150 does not have to report when it has average reception quality equal to or higher than a predetermined level. In this case, reporting user specification section 104 determines that the average reception quality of mobile station apparatus 150 which does not report average reception quality information is equal to or higher than the predetermined level, and generates average reception quality information indicating that. By this means, it is possible to reduce the amount of signaling between base station apparatus 100 and mobile station apparatus 150.

Furthermore, reporting user specification section 104 outputs a report requesting signal to dedicated channel transmission processing section 105 which corresponds to specified mobile station apparatus 150. The report requesting signal is a signal that requests only specified mobile station apparatus 150 to report per-subcarrier quality information. In this case, only the specified mobile station apparatus 150 is requested to report per-subcarrier quality information, so that the amount of signaling necessary for selecting subcarriers can be reduced.

When a plurality of mobile station apparatuses 150 shown in FIG. 2 exist, dedicated channel transmission processing section 105 corresponds to one of mobile station apparatuses 150.

In dedicated channel transmission processing section 105, coding section 131 codes transmission data which is transmitted to corresponding mobile station apparatus 150 through a dedicated channel. Furthermore, when receiving a report requesting signal from reporting user specification section 104, coding section 131 codes the report requesting signal. The signal obtained by coding is subjected to modulation processing by modulation section 130 and then output to multiplexing section 109.

Threshold setting section 113 sets a report determination threshold for determinating whether or not mobile station apparatus 150 (i.e., the target receiver) reports per-subcarrier quality information. The set report determination threshold is output to reporting user specification section 104. Threshold setting section 113 controls the report determination threshold to be set according to, for example, the total number of mobile station apparatuses 150 (i.e., the target receivers). In other words, when the total number of mobile station apparatuses 150 (i.e., the target receivers) decreases, the report determination threshold increases, and, when the total number increases, the report determination threshold decreases. When the report determination threshold increases, the proportion of mobile station apparatuses 150 reporting per-subcarrier quality information increases with respect to all mobile station apparatuses 150 (i.e., the target receivers), and, when the report determination threshold decreases, the proportion decreases. Therefore, by controlling the report determination threshold as mentioned above, it is possible to maintain the total number of mobile station apparatuses 150 reporting per-subcarrier quality information constant and thereby keep interference by control channels constant. In other words, the capacity of the subject cell or other cell is not degraded by interference. When the threshold is sufficiently high, all mobile station apparatuses 150 (i.e., the target receivers) report per-subcarrier quality information. This is effective when interference in the uplink is not a problem—for example, in an isolated cell environment.

In common channel transmission processing section 106, coding section 141 codes transmission data which is transmitted to mobile station apparatus 150 (i.e., the target receiver) through a common channel. The signal obtained by coding is subjected to modulation processing by modulation section 140 and then output to multiplexing section 109.

Common channel subcarrier selection section 107 selects one of N subcarriers based on the per-subcarrier quality information, which is input from dedicated channel reception processing section 103, corresponding to mobile station apparatus 150 specified by reporting user specification section 104—that is, mobile station apparatus 150 which reported per-subcarrier quality information. The selection procedure will be described later.

Here, with this embodiment, a common channel used for data multicasting or broadcasting is frequency-divided into N subchannels by N subcarriers, and the divided N common channels, namely, subchannels, correspond with N subcarriers having different frequencies. Therefore, common channel subcarrier selection section 107 determines the common channel identified by the selected subcarrier to be the subcarrier used for multicasting or broadcasting of the transmission data coded by coding section 141 and modulated by modulation section 140. That is, common channel subcarrier selection section 107 as a setting means sets the common channel used for data multicasting or broadcasting in a switchable manner among the N common channels based on the average reception quality information and per-subcarrier quality information. The selected subcarrier is reported to multiplexing section 109. Furthermore, the selected subcarrier is separately reported to mobile station apparatus 150 (i.e., the target receiver) through the dedicated channel or the common channel.

Furthermore, as described above, common channel subcarrier selection section 107 selects a subcarrier based on the per-subcarrier quality information corresponding to specified mobile station apparatus 150 among the input per-subcarrier quality information, so that it is possible to reduce the amount of necessary information when selecting a subcarrier, efficiently select the optimum subcarrier, and make the setting of a common channel more efficient.

Here, when per-subcarrier quality information corresponding to one of specified mobile station apparatuses 150 is not input due to, for example, a reception error, common channel subcarrier selection section 107 selects a subcarrier based on only the per-subcarrier quality information input from dedicated channel reception processing section 103 among the per-subcarrier quality information corresponding to specified mobile station apparatus 150.

Reception quality lowest value extraction section 108 extracts the lowest value from the instantaneous reception quality of the subcarrier selected at common channel subcarrier selection section 107 using the instantaneous reception quality per subcarrier indicated in the per-subcarrier quality information of mobile station apparatus 150 input from dedicated channel reception processing section 103. The extracted lowest value is output to transmission power control section 110.

Multiplexing section 109 multiplexes the dedicated channels and common channels with their respectively corresponding subcarriers. More specifically, multiplexing section 109 assigns a dedicated channel corresponding to mobile station apparatus 150 to a subcarrier for mobile station apparatus 150. Furthermore, multiplexing section 109 assigns a common channel to the subcarrier selected by common channel subcarrier selection section 107. A common pilot channel used for measurement of reception quality of subcarriers may be assigned to subcarriers by code division multiplexing or time division multiplexing.

Transmission power control section 110 controls a transmission power of the dedicated channel and a common channel by assigning transmission power resources to the dedicated channel and the common channel so that the subcarrier to which the dedicated channel or the common channel is assigned satisfies predetermined reception quality. For example, transmission power control section 110 controls transmission power using the information input from reception quality lowest value extraction section 108 so that the common channel satisfies the required reception quality of data multicasting or broadcasting.

IFFT section 111 performs an IFFT on the signal of the channels, transmission power of which is controlled. The signal subjected to the IFFT is subjected to predetermined transmission processing including, for example, D/A conversion and up-conversion by transmission radio section 112 and transmitted to mobile station apparatus 150 through antenna 101.

Mobile station apparatus 150 has: antenna 151; reception radio section 152; FFT section 153; channel separation section 154; common channel reception processing section 155; dedicated channel reception processing section 156; average reception quality measuring section 157; instantaneous reception quality measuring section 159; dedicated channel transmission processing section 160; and transmission radio section 161. Furthermore, common channel reception processing section 155 has demodulation section 170 and decoding section 171. Dedicated channel reception processing section 156 has demodulation section 180 and decoding section 181. Dedicated channel transmission processing section 160 has coding section 190, modulation section 191 and IFFT section 192.

Reception radio section 152 performs predetermined reception processing including down-conversion and A/D conversion on the radio signal received through antenna 151. The signal subjected to reception processing is subjected to FFT processing by FFT section 153 and output to channel separation section 154.

Channel separation section 154 distinguishes the channel used with respect to the signal input from FFT section 153. Channel separation section 154 then outputs a signal of a reception quality measurement channel to average reception quality measuring section 157 and instantaneous reception quality measuring section 159, outputs a signal of a dedicated channel to dedicated channel reception processing section 156, and outputs a signal of a common channel to common channel reception processing section 155.

In common channel reception processing section 155, demodulation section 170 performs demodulation processing on the signal input from channel separation section 154, and decoding section 171 decodes the signal subjected to the demodulation processing, and thereby obtains data transmitted using a common channel.

In dedicated channel reception processing section 156, demodulation section 180 performs demodulation processing on the signal input from channel separation section 154, and decoding section 181 decodes the signal subjected to the decoding processing, and thereby obtains the data transmitted using a dedicated channel.

When base station apparatus 100 transmits a report requesting signal to aforementioned mobile station apparatus 150, the report requesting signal is obtained by decoding the signal at decoding section 181. In this case, decoding section 181 outputs the report requesting signal to instantaneous reception quality measuring section 159.

Average reception quality measuring section 157 periodically measures average reception quality (for example, average of SIR and average of CIR) of N subcarriers using the signal input from channel separation section 154, obtains average reception quality information indicating the measurement result, and outputs this to coding section 190. Therefore, the average reception quality information is periodically reported to base station apparatus 100. With this embodiment, it is also possible to use average reception quality information also used for RRM (Radio Resource Management) such as determination of handover. In this case, additional transmission of control information is unnecessary, so that it is possible to prevent increases in the amount of transmission information.

As described above, it is not necessary to report the average reception quality when the average reception quality information is equal to or higher than a predetermined level. By this means, it is possible to reduce the amount of signaling between base station apparatus 100 and mobile station apparatus.

Instantaneous reception quality measuring section 159 periodically measures instantaneous reception quality (for example, SIR and CIR) of N subcarriers using the signal input from channel separation section 154, and obtains per-subcarrier quality information indicating the measurement result. Furthermore, when no report requesting signal is input, instantaneous reception quality measuring section 159 does not measure instantaneous reception quality or does not output the obtained per-subcarrier quality information to coding section 190. On the other hand, when a report requesting signal is input, instantaneous reception quality measuring section 159 outputs the obtained per-subcarrier quality information to coding section 190. In this way, the per-subcarrier quality information is reported to base station apparatus 100.

In dedicated channel transmission processing section 160, coding section 190 codes transmission data to be transmitted to base station apparatus 100 using a dedicated channel. Furthermore, when average reception quality information is input from average reception quality measuring section 157, coding section 190 codes the average reception quality information. Furthermore, when per-subcarrier quality information is input from instantaneous reception quality measuring section 159, coding section 190 codes the per-subcarrier quality information. The signal obtained by coding is subjected to modulation processing by modulation section 191, and is then subjected to IFFT processing by IFFT section 192. Transmission radio section 161 performs predetermined transmission processing such as D/A conversion and up-conversion on the signal subjected to the IFFT processing and transmits the signal to base station apparatus 100 through antenna 151.

Hereinafter, the operations of base station apparatus 100 and mobile station apparatus 150 having the above described configurations will be explained. Here, an example will be explained where base station apparatus 100 carries out radio communications with five mobile station apparatuses 150*a*, 150*b*, 150*c*, 150*d* and 150*e* having the same configurations as mobile station apparatus 150.

Figure 3:
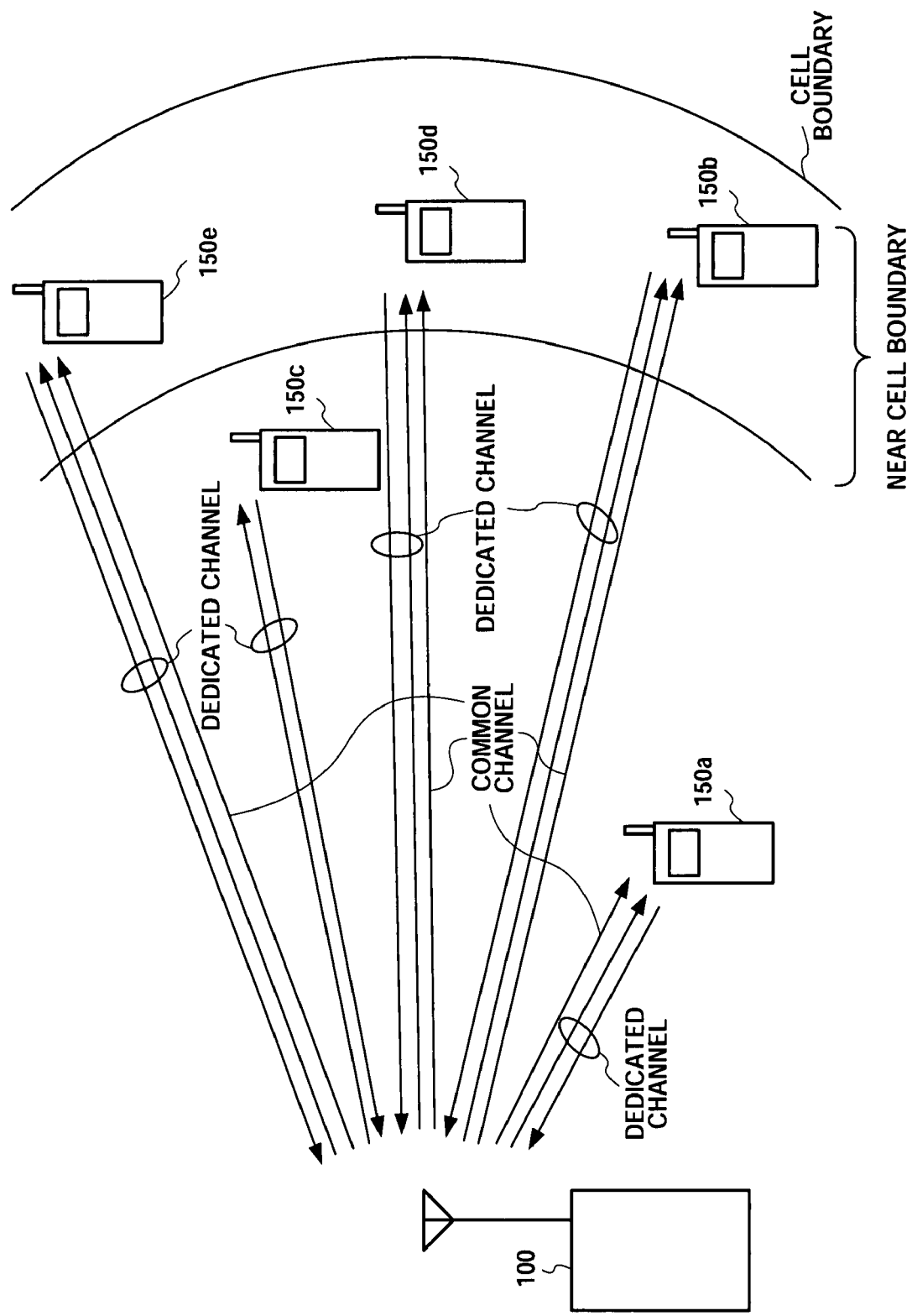
FIG. 3 is a diagram illustrating the operations of the base station apparatus and the mobile station apparatus according to Embodiment 1 of the present invention.

As shown in FIG. 3, four mobile station apparatuses 150*a*, 150*b*, 150*d* and 150*e* except mobile station apparatus 150*c* receive signals using a common channel—that is, these are multicasting or broadcasting target receivers. Mobile station apparatus 150c receives signals using only a dedicated channel—that is, this is not a multicasting or broadcasting target receiver. Furthermore, three mobile station apparatuses 150b, 150d and 150e are located near the cell boundary. On the otherhand, mobile station apparatuses 150a and 150c have shorter distance to base station apparatus 100 than mobile station apparatuses 150b, 150d and 150e, and are not located near the cell boundary.

First, mobile station apparatuses 150a to 150e report the average reception quality information measured at average reception quality measuring section 157 to base station apparatus 100.

Base station apparatus 100 then specifies one of target receivers at reporting user specification section 104. More specifically, base station apparatus 100 determines whether or not the average reception quality indicated in average reception quality information reported from mobile station apparatuses 150a, 150b, 150d and 150e (i.e., the target receivers), is equal to or lower than a predetermined level. By this means, target receivers located near the cell boundary in a poor reception environment—that is, mobile station apparatuses 150b, 150d and 150e—are identified.

Furthermore, the mobile station apparatuses the measured average reception quality of which is equal to or lower than the report determination threshold (for example, mobile station apparatus 150b, 150d and 150e) report per-subcarrier quality information obtained at instantaneous reception quality measuring section 159 to base station apparatus 100.

Common channel subcarrier selection section 107 of base station apparatus 100 then selects subcarriers to identify a common channel to be used based on the per-subcarrier quality information reported from mobile station apparatuses 150b, 150d and 150e from all the reported per-subcarrier quality information. The reported per-subcarrier quality information indicates a plurality of subcarriers #1 to #6 as selection candidates and instantaneous reception quality of subcarriers #1 to #6 as shown in FIG. 4.

Here, the subcarrier selection procedure at common channel subcarrier selection section 107 will be explained in detail.

First, the lowest per-subcarrier instantaneous reception quality at mobile station apparatuses 150b, 150d, 150e is extracted per subcarrier. That is, instantaneous reception quality (−3 dB) at mobile station apparatus 150e, instantaneous reception quality (2 dB) at mobile station apparatus 150b, instantaneous reception quality (−5 dB) at mobile station apparatus 150b, instantaneous reception quality (−4 dB) at mobile station apparatus 150e, instantaneous reception quality (−5 dB) at mobile station apparatus 150e, instantaneous reception quality (−5 dB) at mobile station apparatus 150d are for subcarrier #1, subcarrier #2, subcarrier #3, subcarrier #4, subcarrier #5, subcarrier #6, respectively.

Moreover, the highest reception quality extracted per subcarriers is extracted. That is, instantaneous reception quality (2 dB) is extracted for subcarrier #2. Then, subcarrier #2 which corresponds to the finally extracted instantaneous reception quality is selected. By this means, it is possible to minimize transmission power required for multicasting or broadcasting and surely deliver data to all target receivers including specified mobile station apparatuses 150b, 150d and 150e.

Subcarrier #2 thus selected is reported to multiplexing section 109, and multiplexing section 109 assigns a common channel to subcarrier #2.

Figure 5:
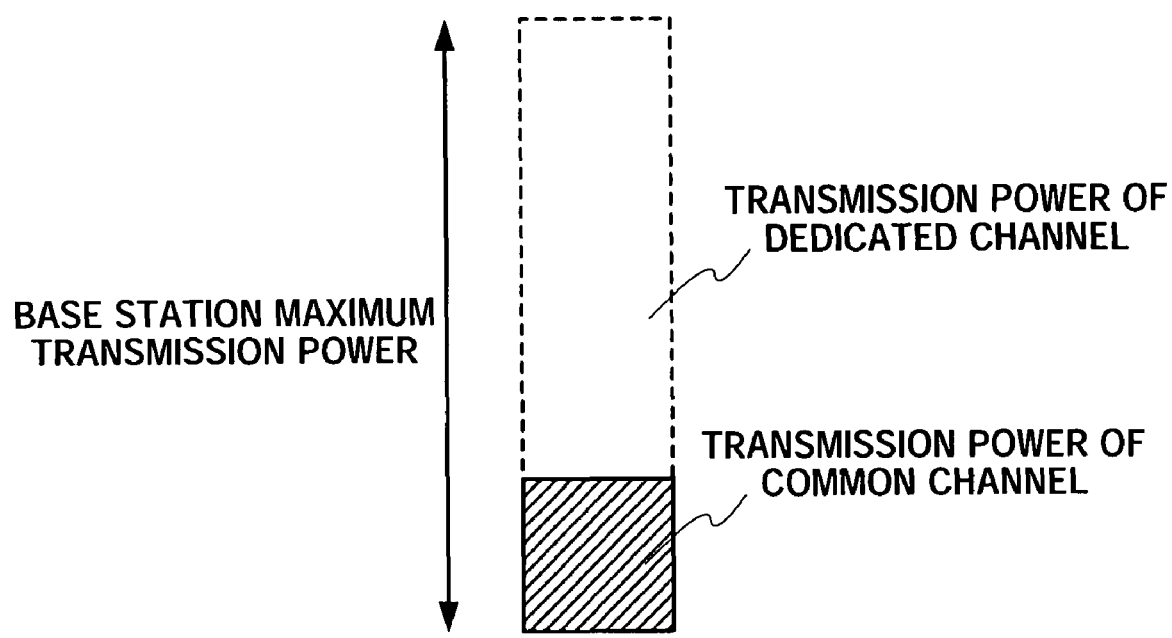
FIG. 5 is a diagram illustrating a transmission power setting of each channel according to Embodiment 1 of the present invention.

Transmission power control section 110 then divides predetermined base station maximum transmission power resources to transmission power of the common channel and transmission power of the dedicated channel as shown in FIG. 5 based on the extracted instantaneous reception quality and thereby sets transmission power of the channels.

In this way, according to this embodiment, a common channel (subchannel) used for multicasting or broadcasting is set based on the reception quality information of mobile station apparatuses 150 as multicasting or broadcasting target receivers in a switchable manner among a plurality of divided common channels (subchannels), so that it is possible to carry out multicasting or broadcasting by switching to a common channel (subchannel) that is able to carry out multicasting or broadcasting with the smallest possible transmission power with which data is be surely transmitted to mobile station apparatuses 150—that is, it is possible to minimize transmission power required for multicasting or broadcasting—and, consequently increase the system capacity or a dedicated channel capacity and surely deliver data to mobile station apparatuses 150 (i.e., the target receivers).

Also, according to this embodiment, one of a plurality of subcarriers having different frequencies is selected, and a common channel (subchannel) identified by the selected subcarrier is determined to be a common channel (subchannel) used for multicasting or broadcasting, so that it is possible to realize the aforementioned operations and effects by applying the multicarrier transmission scheme to multicasting or broadcasting.

With this embodiment, an example has been explained where a common channel is frequency-divided. However, a scheme for dividing a common channel is not limited to this. For example, the above described operations and effects can be realized even when a common channel is temporally divided, and the above described operations and effects can also be realized when a common channel is spatially divided. When a common channel is temporally divided, one of a plurality of time slots is selected based on the reception quality information, and a common channel (subchannel) identified by the selected time slot is used. Furthermore, when a common channel is spatially divided, one of a plurality of antennas is selected based on the reception quality information, and a common channel (subchannel) identified by the selected antenna is used. By this means, the above described operations and effects can be realized.

Embodiment 2

Figure 6:
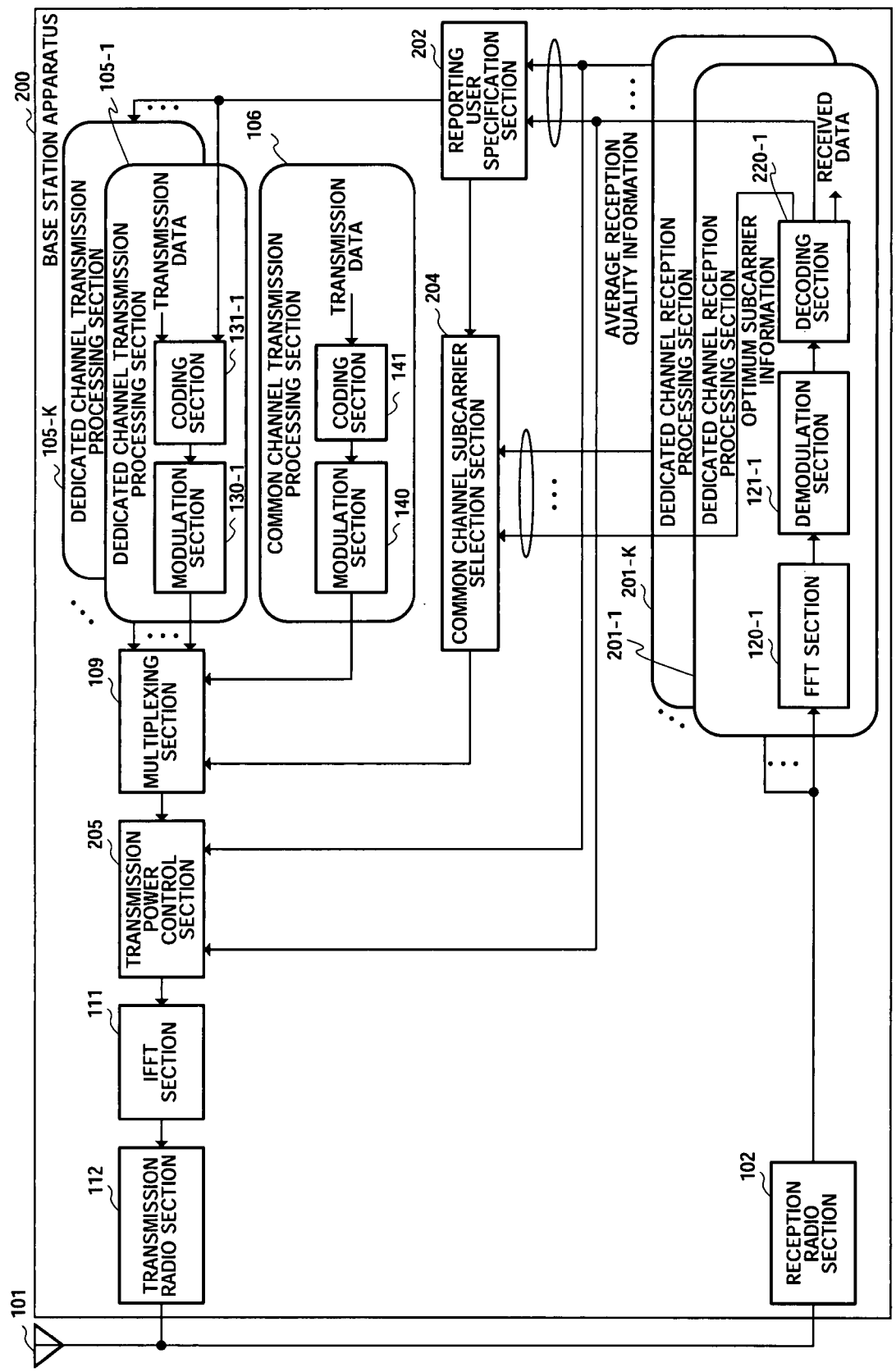
FIG. 6 is a block diagram showing the configuration of a base station apparatus according to Embodiment 2 of the present invention.
Figure 7:
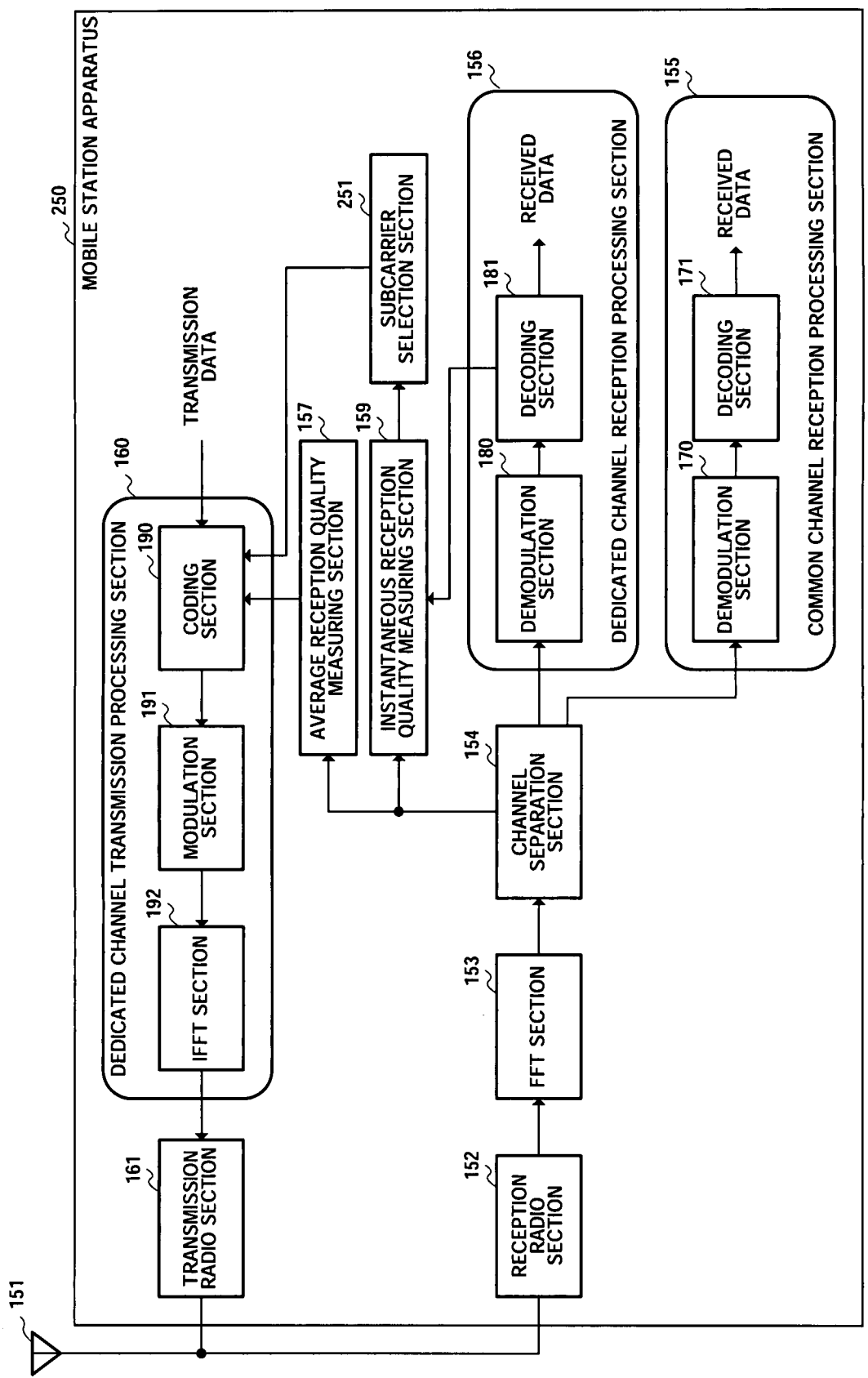
FIG. 7 is a block diagram showing the configuration of a mobile station apparatus according to Embodiment 2 of the present invention.

FIG. 6 is a block diagram showing the configuration of a base station apparatus to which a radio transmission apparatus according to Embodiment 2 of the present invention is applied. Furthermore, FIG. 7 is a block diagram showing the configuration of a mobile station apparatus according to Embodiment 2 of the present invention. Base station apparatus 200 shown in FIG. 6 and mobile station apparatus 250 shown in FIG. 7 have the same basic configurations as base station apparatus 100 shown in FIG. 1 and mobile station apparatus 150 shown in FIG. 2, and the same components are assigned the same reference numerals and their detailed explanations will be omitted.

Base station apparatus 200 has dedicated channel reception processing sections 201-1, . . . , 201-K, reporting user specification section 202, common channel subcarrier selection section 204, and transmission power control section 205, instead of dedicated channel reception processing sections 103-1 to 103-K, reporting user specification section 104, common channel subcarrier selection section 107, and transmission power control section 110 at base station apparatus 100. Furthermore, base station apparatus 200 is not provided with reception quality lowest value extraction section 108.

Furthermore, dedicated channel reception processing section 201-1 has FFT section 120-1, demodulation section 121-1 and decoding section 220-1 explained in Embodiment 1. Dedicated channel reception processing sections 201-1 to 201-K have the same internal configuration, and so an arbitrary one of dedicated channel reception processing sections 201-1 to 201-K will be referred to as "dedicated channel reception processing section 201" in the explanation below. Furthermore, the internal configuration of dedicated channel reception processing section 201 will be abbreviated to FFT section 120, demodulation section 121 and decoding section 220, respectively.

When a plurality of mobile station apparatuses 250 exist, each dedicated channel reception processing section 201 corresponds to one of mobile station apparatuses 250. Furthermore, dedicated channel reception processing section 201 acquires reception quality information of radio receiving apparatuses 250.

More specifically, in dedicated channel reception processing section 201, decoding section 220 obtains received data and reception quality information by decoding a signal obtained by demodulation processing. The reception quality information is information which is reported from corresponding mobile station apparatus 250 and contains average reception quality information and optimum subcarrier information. When average reception quality information is obtained, the average reception quality information is output to reporting user specification section 202 and transmission power control section 205. When optimum subcarrier information is obtained, the optimum subcarrier information is output to common channel subcarrier selection section 204. The optimum subcarrier information will be described later.

Reporting user specification section 202 specifies one of mobile station apparatuses 250 (i.e., the target receivers) among the input average reception quality information based on the average reception quality information reported from mobile station apparatuses 250 (i.e., the target receivers).

More specifically, reporting user specification section 202 identifies mobile station apparatus 250 with the lowest average reception quality indicated in the average reception quality information among mobile station apparatuses 250 (i.e., the target receivers). For example, reporting user specification section 202 determines which mobile station apparatus 250 has the lowest average reception quality and identifies mobile station apparatus 250 which is located the farthest from base station apparatus 200 in a poor reception environment among mobile station apparatuses 250 (i.e., the target receivers). Furthermore, for example, by carrying out the aforementioned determination, reporting user specification section 202 identifies mobile station apparatus 150 requiring the largest transmission power among mobile station apparatuses 250 (i.e., the target receivers) when performing data multicasting or broadcasting. In this way, mobile station apparatus 150 is specified. The specification result is reported to common channel subcarrier selection section 204.

Although with this embodiment it is presupposed that all mobile station apparatuses 250 carrying out radio communications with base station apparatus 200 periodically report average reception quality information, mobile station apparatus 250 does not have to report when it has average reception quality equal to or higher than a predetermined level. In this case, reporting user specification section 202 determines that the average reception quality of mobile station apparatus 250 which does not report the average reception quality information is equal to or higher than a predetermined level and generates average reception quality information indicating that. By this means, it is possible to reduce the amount of signaling between base station apparatus 200 and mobile station apparatus 250.

Furthermore, reporting user specification section 202 outputs a report requesting signal to dedicated channel transmission processing section 105 which corresponds to specified mobile station apparatus 250. The report requesting signal is a signal which requests only specified mobile station apparatus 250 to report optimum subcarrier information. In this way, only specified mobile station apparatus 250 is requested to report subcarrier information, so that it is possible to reduce the amount of signaling required for selecting a subcarrier to a minimum.

Common channel subcarrier selection section 204 selects one of N subcarriers based on the optimum subcarrier information that is input from dedicated channel reception processing section 201 and that is the optimum subcarrier information corresponding to mobile station apparatus 250 specified by reporting user specification section 202. More specifically, common channel subcarrier selection section 204 selects the subcarrier indicated in the optimum subcarrier information. The subcarrier indicated in the optimum subcarrier information is a subcarrier having the highest instantaneous reception quality among the N subcarriers in other words, subcarrier having the smallest transmission power required for multicasting or broadcasting is performed.

In this way, a subcarrier having the highest instantaneous reception quality is selected, or a subcarrier requiring the smallest transmission power when performing multicasting or broadcasting is selected, so that it is possible to surely minimize transmission power required for delivering data to all target receivers including specified mobile station apparatus 250.

Here, with this embodiment, like Embodiment 1, a common channel used for data multicasting or broadcasting is frequency-divided into N subchannels by N subcarriers, and the divided N common channels, namely, subchannels, correspond to N subcarriers having different frequencies. Therefore, common channel subcarrier selection section 204 determines the common channel identified by the selected subcarrier to be the subcarrier used for multicasting or broadcasting of transmission data coded by coding section 141 and modulated by modulation section 140. That is, common channel subcarrier selection section 204 sets the common channel used for data multicasting or broadcasting in a switchable manner among the N common channels based on the average reception quality information and the optimum subcarrier information. The selected subcarrier is reported to multiplexing section 109. Furthermore, the selected subcarrier is separately reported to mobile station apparatus 250 (i.e., the target receiver) through a dedicated channel or common channel.

Furthermore, as mentioned above, common channel subcarrier selection section 204 selects a subcarrier based on the optimum subcarrier information corresponding to only specified mobile station apparatus 250—that is, mobile station apparatus 250 which is located the farthest—so that it is possible to reduce the amount of necessary information when selecting a subcarrier, efficiently select the optimum subcarrier, and make the setting of a common channel more efficient.

Transmission power control section 205 controls the transmission power of the dedicated channel and the common channel by assigning transmission power resources to the dedicated channel and the common channel so that the subcarrier to which the dedicated channel or the common channel is assigned satisfies predetermined reception quality.

Here, transmission power control section 205 controls transmission power of the common channel using the average reception quality reported from mobile station apparatus 250 specified by reporting user specification section 202.

In addition to the configuration of mobile station apparatus 150, mobile station apparatus 250 has subcarrier selection section 251.

Subcarrier selection section 251 specifies a subcarrier having the highest instantaneous reception quality using the per-subcarrier quality information obtained by instantaneous reception quality measuring section 159. Subcarrier selection section 251 then generates optimum subcarrier information indicating the identified subcarrier and outputs this to coding section 190. With this embodiment, the per-subcarrier quality information obtained by instantaneous reception quality measuring section 159 is not output to coding section 190.

Hereinafter, the operations of base station apparatus 200 and mobile station apparatus 250 having the above described configurations will be explained. Here, an example will be explained where base station apparatus 200 carries out radio communications with three mobile station apparatuses 250*a*, 250*b* and 250*c* having the same configurations as mobile station apparatus 250 will be explained.

Figure 8:
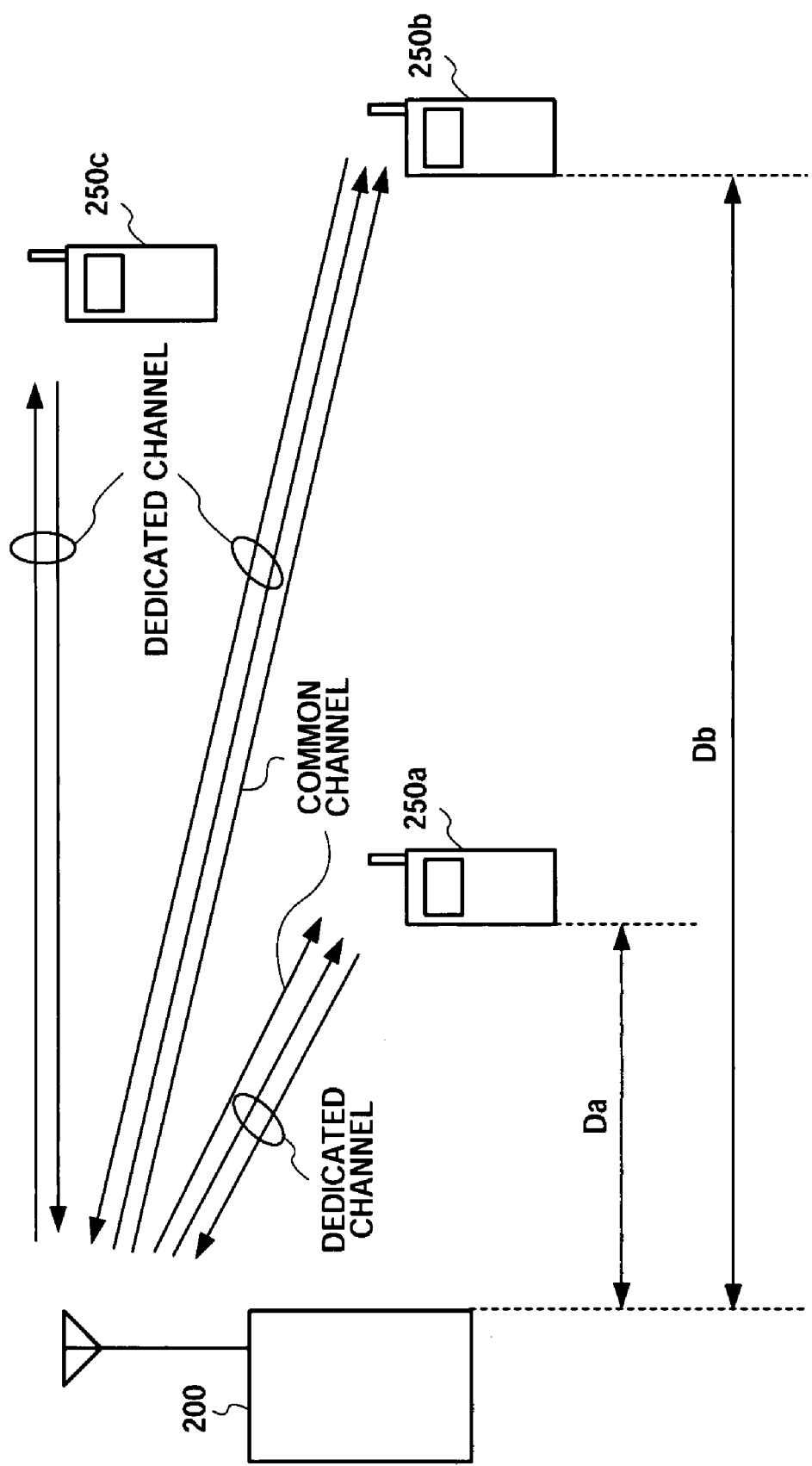
FIG. 8 is a diagram illustrating the operations of the base station apparatus and the mobile station apparatus according to Embodiment 2 of the present invention.

As shown in FIG. 8, two mobile station apparatuses 250*a* and 250*b* except mobile station apparatus 250*c* carry out reception using a common channel—that is, these are multicasting or broadcasting target receivers. Mobile station apparatus 250*c* carries out reception using only a dedicated channel—that is, this is not a multicasting or broadcasting target receiver. Furthermore, distance Db from base station apparatus 200 to mobile station apparatus 250*b* is greater than distance Da from base station apparatus 200 to mobile station apparatus 250*a*.

First, mobile station apparatuses 250*a* to 250*c* report average reception quality information measured at average reception quality measuring section 157 to base station apparatus 200.

Figure 9A:
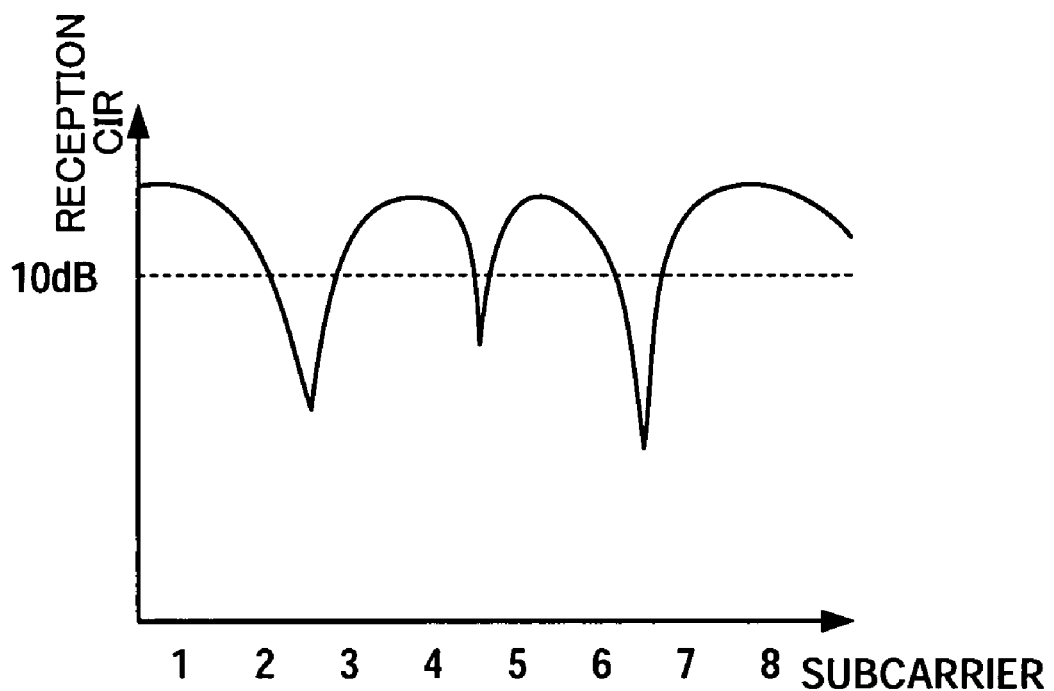
FIG. 9A is a diagram illustrating an example of reception quality information according to Embodiment 2 of the present invention.
Figure 9B:
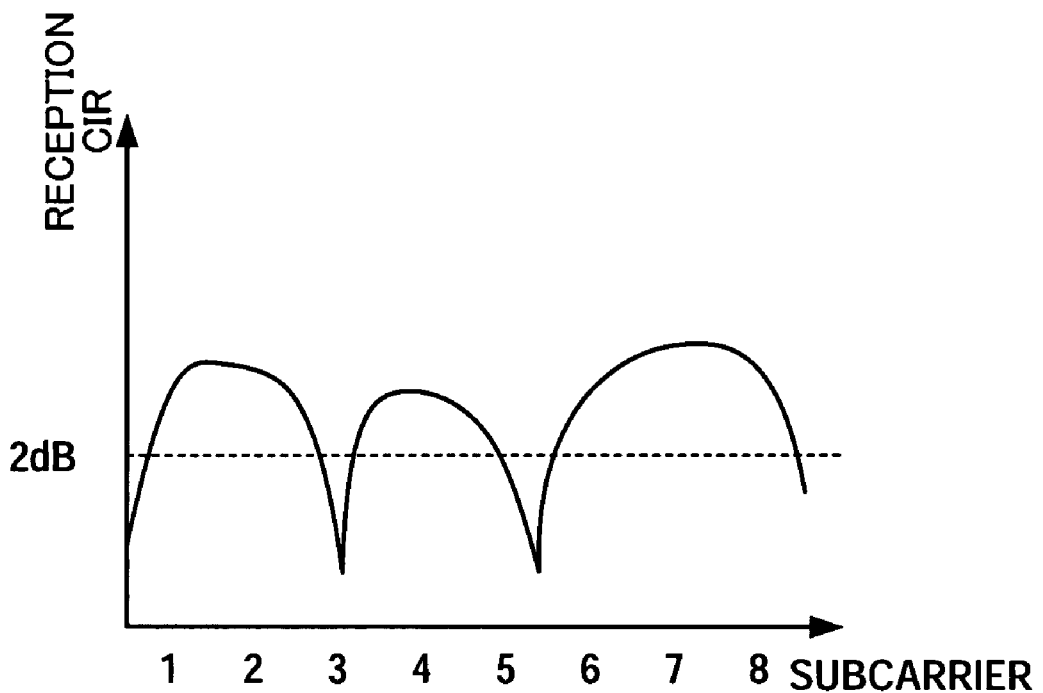
FIG. 9B is a diagram illustrating another example of reception quality information according to Embodiment 2 of the present invention.

Base station apparatus 200 then specifies one target receiver at reporting user specification section 202. More specifically, reporting user specification section 202 compares the average reception quality indicated in average reception quality information reported from mobile station apparatuses 250*a* and 250*b* (i.e., the target receivers). The average reception quality of mobile station apparatus 250*a* is approximately 10 dB as shown in FIG. 9A, and the average reception quality of mobile station apparatus 250*b* is approximately 2 dB as shown in FIG. 9B. Therefore, as the comparison result, reporting user specification section 202 identifies a target receiver located at the farthest place—that is, mobile station apparatus 250*b*.

Next, by outputting a report requesting signal at reporting user specification section 202, base station apparatus 200 requests mobile station apparatus 250*b* to report optimum subcarrier information.

Mobile station apparatus 250*b* then generates the optimum subcarrier information at subcarrier selection section 251. The subcarrier having the optimum instantaneous reception quality at mobile station apparatus 250*b* is subcarrier #2, and so the optimum subcarrier information indicating subcarrier #2 is reported to base station apparatus 200.

Base station apparatus 200 then selects subcarrier #2 indicated in the reported optimum subcarrier information at common channel subcarrier selection section 204.

Subcarrier #2 thus selected is reported to multiplexing section 109, and multiplexing section 109 assigns a common channel to subcarrier #2.

Transmission power control section 205 then divides predetermined base station maximum transmission power resources to transmission power of the common channel and transmission power of the dedicated channel based on the reported average reception quality thereby sets transmission power of the channels.

In this way, with this embodiment mobile station apparatus 250 having the lowest average reception quality is identified, so that it is possible to select a subcarrier based on the optimum subcarrier information of mobile station apparatus 250 for which sure data delivery is most difficult due to the reception environment, and surely prevent failure in data delivery. Furthermore, mobile station apparatus 250 located the farthest from base station apparatus 200 is identified, so that it is possible to select a subcarrier based on the optimum subcarrier information of mobile station apparatus 250 for which sure data delivery is most difficult due to the geographical position, and surely prevent failures in data delivery. Furthermore, mobile station apparatus 250 requiring the maximum transmission power when performing data multicasting or broadcasting is identified, so that it is possible to select a subcarrier based on the optimum subcarrier information of mobile station apparatus 250 requiring the maximum transmission power for sure data delivery and prevent transmission power from being assigned to a common channel uselessly.

Furthermore, according to this embodiment, the number of specified mobile station apparatuses 250 is limited to one, so that, compared to Embodiment 1, it is possible to reduce the amount of information used for the whole control.

With this embodiment, an example has been explained where a common channel is frequency-divided. However, a scheme for dividing a common channel is not limited to this. For example, the above described operations and effects can be realized also when a common channel is temporally divided, and the above described operations and effects can be realized also when a common channel is spatially divided. When a common channel is temporally divided, one of a plurality of time slots is selected based on the reception quality information, and the common channel (subchannel) identified by the time slot is used. Furthermore, when a common channel is spatially divided, one of a plurality of antennas is identified based on the reception quality information, and the common channel (subchannel) specified by the selected antenna is used. By this means, the above described operations and effects can be realized.

Furthermore, with this embodiment, the configuration has been explained where reporting of only the subcarrier having the highest instantaneous reception quality is requested, only the subcarrier having the highest instantaneous reception quality is reported and the reported subcarrier is selected. However, the configuration for selecting a subcarrier is not limited to this alone. For example, the above described operations and effects can also be realized with a configuration where base station apparatus 200 requests mobile station apparatus 250 to report subcarriers having the highest instantaneous reception quality up to a predetermined number among N subcarriers, mobile station apparatus 250 reports the predetermined number of requested subcarriers as selection candidates to base station apparatus 200, and base station apparatus 200 selects one of the reported predetermined number of subcarriers. Furthermore, in this case, it is possible to adaptively select one of a plurality of subcarriers presented from mobile station apparatus 250.

Embodiment 3

Figure 10:
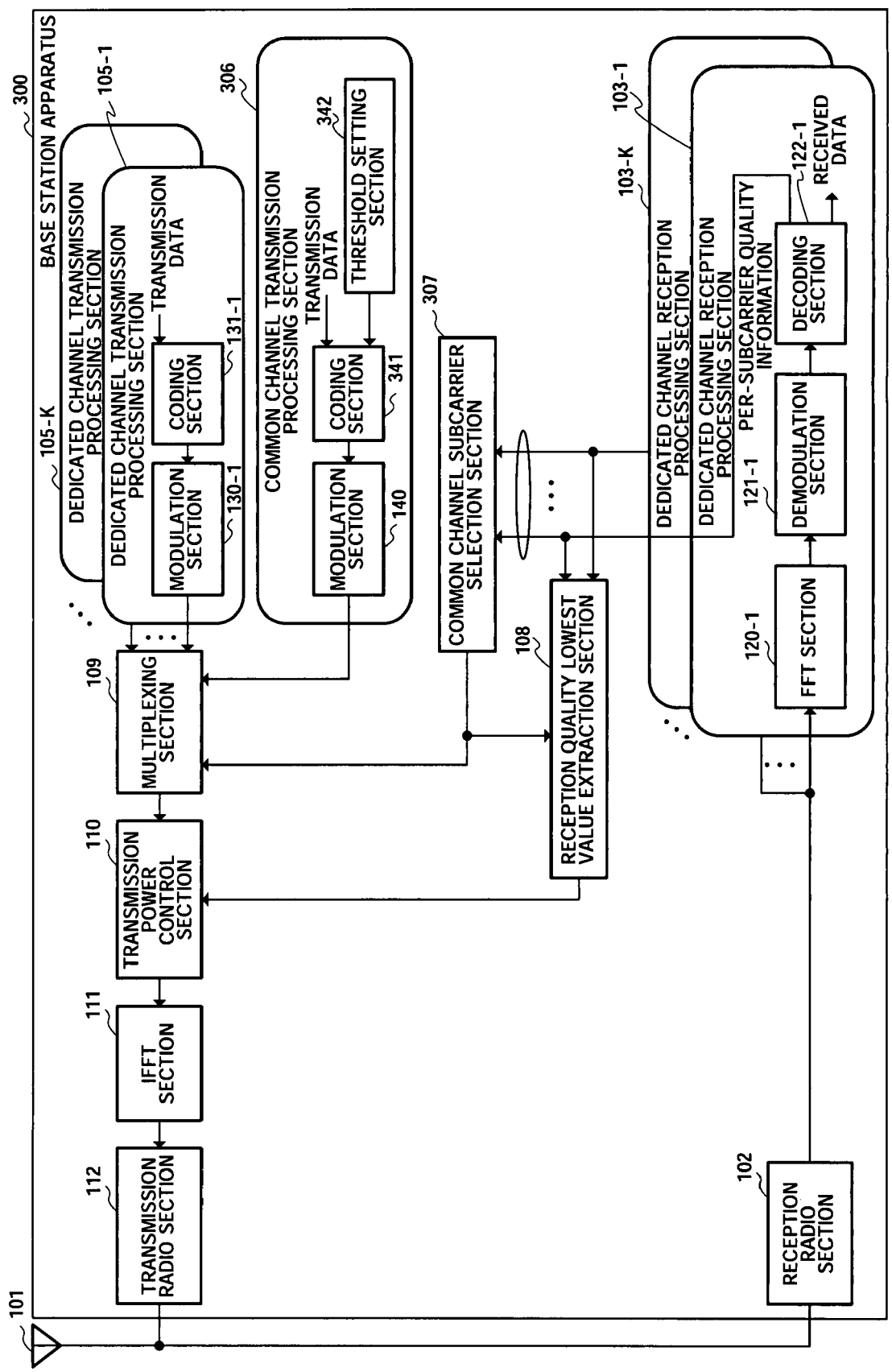
FIG. 10 is a block diagram showing the configuration of a base station apparatus according to Embodiment 3 of the present invention.
Figure 11:
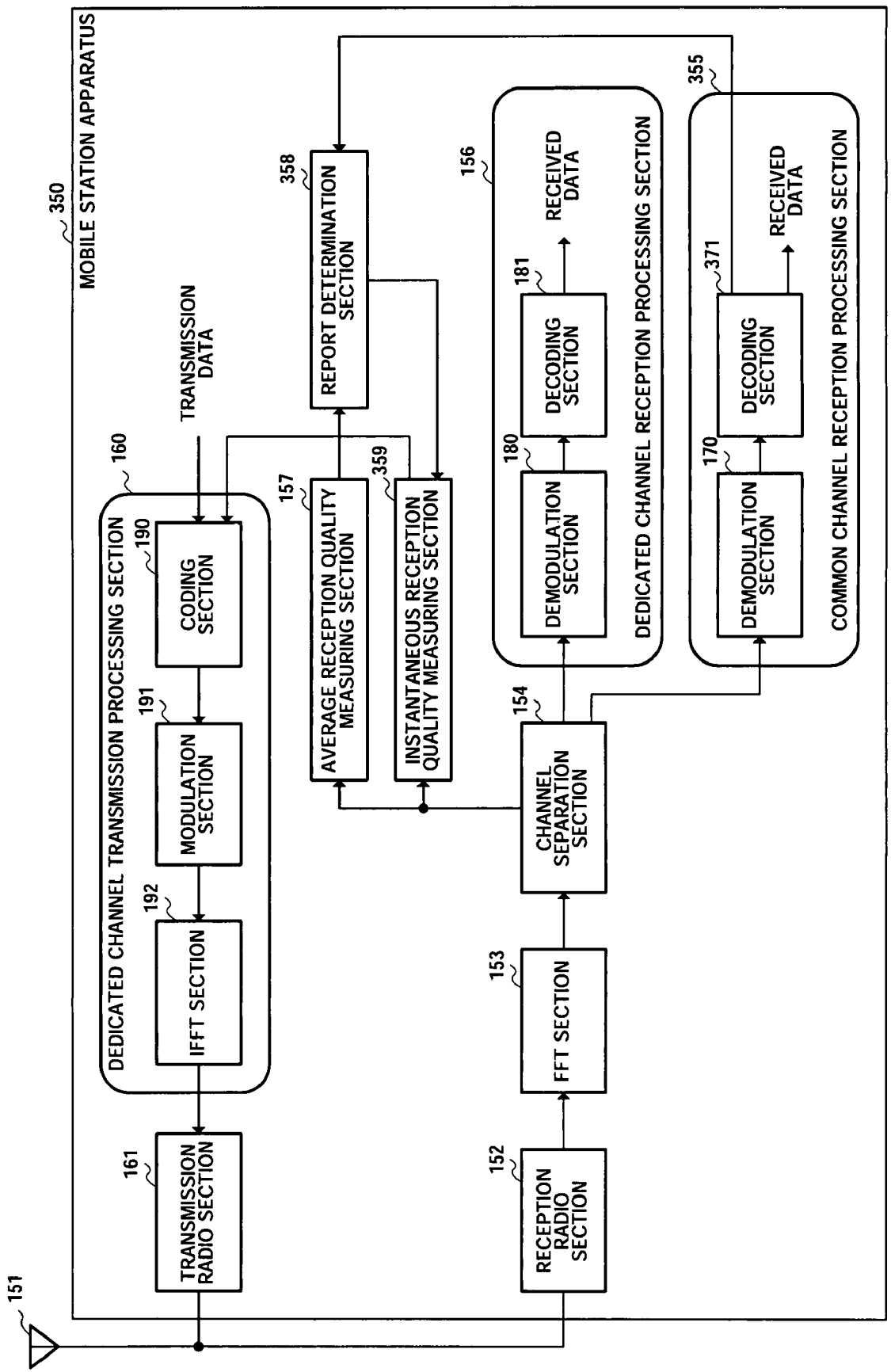
FIG. 11 is a block diagram showing the configuration of a mobile station apparatus according to Embodiment 3 of the present invention.

FIG. 10 is a block diagram showing the configuration of a base station apparatus to which a radio transmission apparatus according to Embodiment 3 of the present invention is applied, and FIG. 11 is a block diagram showing the configuration of a mobile station apparatus which carries out a radio communication with this base station apparatus. Base station apparatus 300 shown in FIG. 10 and mobile station apparatus 350 shown in FIG. 11 adopt the OFDM scheme. Base station apparatus 300 and mobile station apparatus 350 have the same basic configurations as base station apparatus 100 and mobile station apparatus 150 explained Embodiment 1, respectively, and the same components as in Embodiment 1 are assigned the same reference codes and their detailed explanations will be omitted in the explanations below.

Base station apparatus 300 has antenna 101; reception radio section 102; dedicated channel reception processing sections 103-1 to 103-K; dedicated channel transmission processing sections 105-1 to 105-K; reception quality lowest value extraction section 108; multiplexing section 109; transmission power control section 110; IFFT section 111; transmission radio section 112 explained in Embodiment 1, and, in addition, common channel transmission processing section 306; and common channel subcarrier selection section 307.

Common channel transmission processing section 306 has modulation section 140 explained in Embodiment 1, and, in addition, coding section 341 and threshold setting section 342.

In common channel transmission processing section 306, threshold setting section 342 sets a report determination threshold to determine whether or not mobile station apparatuses 350 as (i.e., the target receivers) report per-subcarrier quality information. The set report determination threshold is output to coding section 341. In this way, threshold setting section 342 reports the report determination threshold to all mobile station apparatuses 350 (i.e., the target receivers). In this embodiment, the report determination threshold is reported using a common channel. In this way, the report determination threshold is reported to mobile station apparatuses 350 (i.e., the target receivers), so that it is possible to allow mobile station apparatuses 350 to determine whether or not to report per-subcarrier reception quality, avoid unnecessary signaling when selecting a subcarrier, and thereby reduce the amount of signaling.

Furthermore, threshold setting section 342 may also control setting of a report determination threshold according to, for example, the total number of mobile station apparatuses 350 (i.e., the target receiver). In other words, the report determination threshold increases when the total number of mobile station apparatuses 350 (i.e., the target receiver) decreases and the report determination threshold decreases when the total number increases. When the threshold increases, the proportion of mobile station apparatuses 350 reporting per-subcarrier quality information with respect to all mobile station apparatuses 350 (i.e., the target receivers) increases, and, when the threshold decreases, the proportion decreases. Therefore, by controlling the report determination threshold as described above, it is possible to maintain the total number of mobile station apparatuses 350 reporting per-subcarrier quality information constant and thereby keep interference by a control channel constant. In other words, the capacity of the subject cell or other cell is not degraded by interference. When the threshold is sufficiently high, all mobile station apparatuses 350 (i.e., the target receivers) report per-subcarrier quality information. This is effective when interference in the uplink is not a problem—for example, in an isolated cell environment.

Coding section 341 codes transmission data transmitted to mobile station apparatuses 350 (i.e., the target receiver) through common channels. Furthermore, when a report determination threshold is input from threshold setting section 342, coding section 341 codes a report determination threshold. The signal obtained by coding is subjected to modulation processing by modulation section 140 and then output to multiplexing section 109.

Common channel subcarrier selection section 307 selects one of N subcarriers based on the per-subcarrier quality information input from dedicated channel reception processing section 103 which corresponds to mobile station apparatus 350 which reported per-subcarrier quality information. The selection procedure is the same as in Embodiment 1.

Here, with this embodiment, like Embodiment 1, the common channel used for data multicasting or broadcasting is frequency-divided into N subchannels by N subcarriers, and the divided N common channels, that is, subchannels correspond to N subcarriers having different frequencies respectively. Therefore, common channel subcarrier selection section 307 determines the common channel identified by the selected subcarrier as the subcarrier used for multicasting or broadcasting of the transmission data coded by coding section 341 and modulated by modulation section 140. That is, common channel subcarrier selection section 307 sets the common channel used for data multicasting or broadcasting in a switchable manner among N common channels based on the average reception quality information and the per-subcarrier quality information. The selected subcarrier is reported to multiplexing section 109. Furthermore, the selected subcarrier is separately reported to mobile station apparatus 350 (i.e., the target receiver) through a dedicated channel or common channel.

When per-subcarrier quality information is not input from any dedicated channel reception processing section 103— that is, when per-subcarrier quality information is not reported from any mobile station apparatus 350—a subcarrier is selected from N subcarriers randomly.

Furthermore, common channel subcarrier selection section 307 selects a subcarrier based on per-subcarrier quality information corresponding to mobile station apparatus 350 which reported per-subcarrier quality information, so that it is possible to reduce the amount necessary information when selecting a subcarrier, efficiently select the optimum subcarrier, and make the setting of a common channel more efficient.

Mobile station apparatus 350 has antenna 151; reception radio section 152; FFT section 153; channel separation section 154; dedicated channel reception processing section 156; average reception quality measuring section 157; dedicated channel transmission processing section 160; transmission radio section 161 explained in Embodiment 1, and, in addition, common channel reception processing section 355; report determination section 358; and instantaneous reception quality measuring section 359. Furthermore, common channel reception processing section 355 has demodulation section 170 explained in Embodiment 1, and, in addition, decoding section 371.

In common channel reception processing section 355, demodulation section 170 performs demodulation processing on the signal input from channel separation section 154, and decoding section 371 obtains data transmitted through the common channel by decoding the signal subjected to demodulation processing. Furthermore, when a report determination threshold transmitted from base station apparatus 300 is obtained by decoding, decoding section 371 outputs the report determination threshold to report determination section 358.

Report determination section 358 compares the average reception quality periodically measured by average reception quality measuring section 157 with the report determination threshold input from decoding section 371. That is, with this embodiment, the average reception quality information obtained by average reception quality measuring section 157 is not input to coding section 190 and is input to report determination section 358.

By carrying out the above described comparison, report determination section 358 determines whether or not to report per-subcarrier quality information obtained by instantaneous reception quality measuring section 359 to base station apparatus 300. That is, when the measured average reception quality is equal to or lower than the report determination threshold, report determination section 358 determines to report per-subcarrier quality information to base station apparatus 300, and, when the measured average reception quality is higher than the report determination threshold, it determines not to report per-subcarrier quality information. The determination result is output to instantaneous reception quality measuring section 359.

Instantaneous reception quality measuring section 359 periodically measures instantaneous reception quality of N subcarriers using the signal input from channel separation section 154 and obtains per-subcarrier quality information indicating the measurement result. Here, when the determination result input from report determination section 358 is that reporting is not to be carried out, instantaneous reception quality measuring section 359 does not measure the instantaneous reception quality, or does not output the obtained per-subcarrier quality information to coding section 190. On the other hand, when the determination result is that reporting is to be carried out, instantaneous reception quality measuring section 359 outputs the obtained per-subcarrier quality information to coding section 190. The per-subcarrier quality information of mobile station apparatus 350 thus determined to be reported is reported to base station apparatus 300.

Hereinafter, the operations of base station apparatus 300 and mobile station apparatus 350 having the above described configurations will be explained. Here, an example will be explained where base station apparatus 300 carries out radio communications with five mobile station apparatuses 350a, 350b, 350c, 350d and 350e having the same configurations as mobile station apparatus 350.

Figure 12:
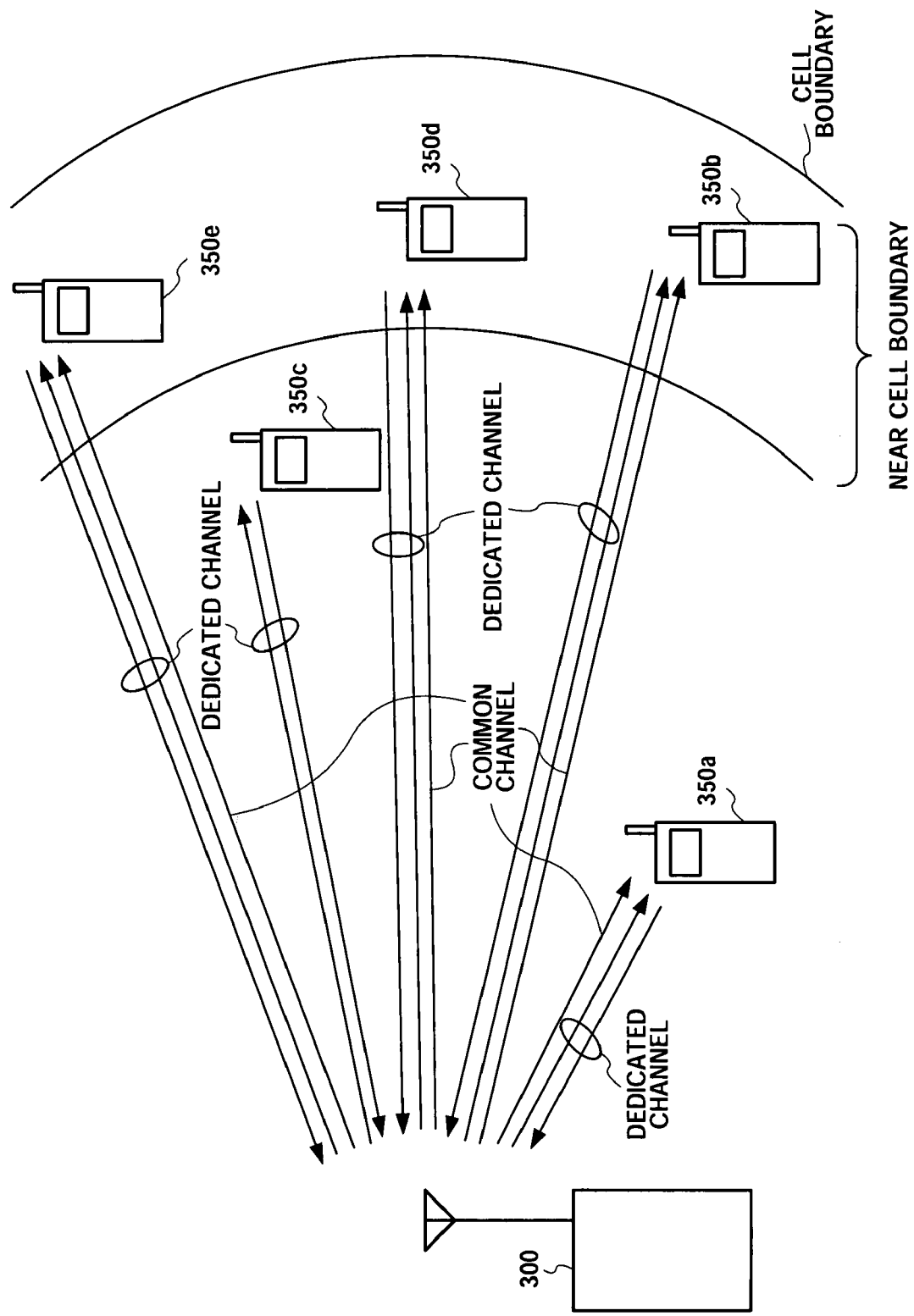
FIG. 12 is a diagram illustrating the operations of the base station apparatus and the mobile station apparatus according to Embodiment 3 of the present invention.

Like Embodiment 1, four mobile station apparatuses 350a, 350b, 350d, 350e except mobile station apparatus 350c carry out reception using a common channel as shown in FIG. 12—that is, these are the multicasting or broadcasting target receivers. Mobile station apparatus 350c carries out reception using only a dedicated channel—that is, this is not the multicasting or broadcasting target receiver. Also, three mobile station apparatuses 350b, 350d and 350e are located near the cell boundary. On the other hand, mobile station apparatuses 350a and 350c are located at a shorter distance from base station apparatus 300 than mobile station apparatuses 350b, 350d and 350e, and are not located near the cell boundary.

First, base station apparatus 300 reports a report determination threshold to mobile station apparatuses 350a, 350b, 350d and 350e using a common channel. Mobile station apparatuses 350a, 350b, 350d, 350e compare the average reception quality information measured at average reception quality measuring section 157 with the report determination threshold reported from base station apparatus 300 at report determination section 358, and report the per-subcarrier quality information to base station apparatus 300 when the measured average reception quality is equal to or lower than the report determination threshold, or does not report the per-subcarrier quality information when the measured average reception quality is higher than the report determination threshold. Here, the target receivers located near the cell boundary—that is, mobile station apparatuses 350b, 350d and 350e report per-subcarrier quality information to base station apparatus 300.

Then, base station apparatus 300 selects a subcarrier for identifying a common channel to be used based on the per-subcarrier quality information reported from mobile station apparatuses 350b, 350d and 350e among all per-subcarrier quality information which is reported at common channel subcarrier selection section 307. The per-subcarrier quality information is the same as in Embodiment 1, and the subcarrier selecting procedure by common channel subcarrier selection section 307 is also the same as in Embodiment 1.

When per-subcarrier reception quality information is not reported from any mobile station apparatus 350—that is, when the average reception quality measured by all mobile station apparatuses 350 is equal to or higher than the report determination threshold, a subcarrier is selected from N subcarriers for a common channel use randomly.

In this way, according to this embodiment, a common channel (subchannel) used for multicasting or broadcasting is set in a switchable manner based on the reception quality information of mobile station apparatus 350 as multicasting or broadcasting target receiver among the plurality of divided common channels (subchannels) so that it is possible to perform multicasting or broadcasting by switching to a common channel (subchannel) that is able to perform multicasting or broadcasting with the smallest possible transmission power by which data is surely delivered to mobile station apparatuses 350—that is, it is possible to minimize the transmission power required for multicasting or broadcasting—and, consequently, increase the system capacity or capacity of a dedicated channel and surely deliver data to mobile station apparatuses 350 (i.e., the target receiver).

Furthermore, according to this embodiment, one of a plurality of subcarriers having different frequencies is selected, and a common channel (subchannel) identified by the selected subcarrier is determined to be a common channel (subchannel) used for multicasting or broadcasting, so that it is possible to realize the above described operations and effects by applying a multicarrier transmission scheme to multicasting or broadcasting.

Furthermore, with this embodiment, whether or not mobile station apparatus 350 report per-subcarrier quality information to base station apparatus 300 is determined, and, when reporting is unnecessary, reporting is not carried out. By this means, it is possible to avoid unnecessary information transmission, decrease the amount of interference in the uplink, and consequently improve the system capacity.

With this embodiment, an example has been described where a common channel is frequency-divided. However, a scheme for dividing a common channel is not limited to this. For example, the above described operations and effects can be realized also when a common channel is temporally divided, and the above described operations and effects can be realized also when a common channel is spatially divided. When a common channel is temporally divided, one of a plurality of time slots is selected based on the reception quality information, and a common channel (subchannel) identified by the selected time slot is used. Furthermore, when a common channel is spatially divided, one of a plurality of antennas is selected based on the reception quality information, and the common channel (subchannel) identified by the selected antenna is used. By this means, the above described operations and effects can be realized.

With the above described embodiments, a base station apparatus, mobile station apparatus, and subcarrier may be expressed as "Node B," "UE," and "tone," respectively.

Also, although with the above described embodiments, measurement of reception quality and selection of a channel have been performed per subcarrier, these may also be performed per subcarrier block or chunk which is comprised of a plurality of subcarriers bundled together.

Furthermore, although with the above described embodiments, it is assumed that reception quality is estimated by, for example, a reception SIR or reception CIR, this is by no means limiting, reception quality may also be estimated by a reception SNR, reception SIR, reception SINR, reception CINR, reception power, interference power, bit error rate, throughput and MCS (combination of a modulation scheme and coding rate) capable of achieving a predetermined error rate.

In addition, each of functional blocks employed in the description of the above-mentioned embodiment may typically be implemented as an LSI constituted by an integrated circuit. These are may be individual chips or partially or totally contained on a single chip.

"LSI" is adopted here but this may also be referred to as an "IC," "system LSI," "super LSI," or "ultra LSI" depending on differing extents of integration.

Further, the method of integrating circuits is not limited to the LSI's, and implementation using dedicated circuitry or general purpose processor is also possible. After LSI manufacture, utilization of FPGA (Field Programmable Gate Array) or a reconfigurable processor where connections or settings of circuit cells within an LSI can be reconfigured is also possible.

Furthermore, if integrated circuit technology comes out to replace LSI's as a result of the advancement of semiconductor technology or derivative other technology, it is naturally also possible to carry out function block integration using this technology. Application in biotechnology is also possible.

This application is based on Japanese Patent Application No. 2004-224764, filed on Jul. 30, 2004, the entire content of which is expressly incorporated by reference herein.

INDUSTRIAL APPLICABILITY

The radio transmission apparatus and the radio transmission method of the present invention are suitable for use in carrying out multicasting or broadcasting in a mobile communication system.

The invention claimed is:

1. A radio transmission apparatus for carrying out multicasting or broadcasting of common data for a plurality of radio receiving apparatuses, the radio transmission apparatus comprising:
an acquisition section that acquires per subcarrier reception quality information from at least one of said plurality of radio receiving apparatuses;
a selecting section that selects a subcarrier, wherein the subcarrier is used for the multicasting or the broadcasting of said common data, and the subcarrier is selected among a plurality of subcarriers, each of which has a different frequency, based on the acquired per subcarrier reception quality information; and
a control section that controls transmission power of the selected subcarrier.

2. The radio transmission apparatus according to claim 1, wherein said selecting section extracts the lowest reception quality from the per-subcarrier reception quality of said plurality of radio receiving apparatuses, per subcarrier, and selects a subcarrier corresponding to the highest reception quality from the extracted reception quality.

3. The radio transmission apparatus according to claim 1, wherein said control section controls transmission power so as to satisfy a required reception quality in the multicasting or the broadcasting of said common data.

4. The radio transmission apparatus according to claim 1, wherein said selecting section selects a subcarrier having the highest reception quality among said plurality of subcarriers.

5. The radio transmission apparatus according to claim 1, wherein said selecting section selects a subcarrier requiring the smallest transmission power among said plurality of subcarriers when the multicasting or the broadcasting of said common data for said plurality of radio receiving apparatuses is performed.

6. The radio transmission apparatus according to claim 1, further comprising a determining section that determines at least one radio receiving apparatus which is to be requested to report the per-subcarrier reception quality information, among said plurality of radio receiving apparatuses based on a reception quality from each of said plurality of radio receiving apparatuses, wherein said selecting section selects the subcarrier, based on the per-subcarrier reception quality information acquired from the determined radio receiving apparatus.

7. The radio transmission apparatus according to claim 6, wherein said determining section determines at least one radio receiving apparatus having a reception quality equal to or lower than a threshold among said plurality of radio receiving apparatuses.

8. The radio transmission apparatus according to claim 7, wherein the reception quality is an average reception quality of said plurality of subcarriers.

9. The radio transmission apparatus according to claim 7, further comprising a control section that controls setting of said threshold according to the number of said plurality of radio receiving apparatuses.

10. The radio transmission apparatus according to claim 6, wherein said determining section determines a radio receiving apparatus located near a cell boundary among said plurality of radio receiving apparatuses.

11. The radio transmission apparatus according to claim 6, further comprising a requesting section that requests the determined radio receiving apparatus to report the per-subcarrier reception quality information.

12. The radio transmission apparatus according to claim 6, further comprising a requesting section that requests the selected radio receiving apparatus to report a candidate of the subcarrier to be selected instead of the per-subcarrier reception quality information, wherein said selecting section selects the subcarrier based on the candidate.

13. The radio transmission apparatus according to claim 12, wherein said requesting section requests a reception quality corresponding to the candidate of the subcarrier.

14. The radio transmission apparatus according to claim 1, further comprising a reporting section that reports, to said plurality of radio receiving apparatuses, a threshold used for determining whether or not to report the per-subcarrier reception quality information.

15. The radio transmission apparatus according to claim 14, further comprising a control section that controls the setting of said threshold according to the number of said plurality of radio receiving apparatuses.

16. The radio transmission apparatus according to claim 6, wherein said determining section determines at least one radio receiving apparatus having the lowest reception quality among said plurality of radio receiving apparatuses.

17. The radio transmission apparatus according to claim 6, wherein said determining section determines at least one radio receiving apparatus having the lowest average reception quality of said plurality of subcarriers.

18. The radio transmission apparatus according to claim 6, wherein said determining section determines at least one radio receiving apparatus requiring the largest transmission power among said plurality of radio receiving apparatuses when the multicasting or the broadcasting of said common data is performed.

19. The radio transmission apparatus according to claim 6, wherein said determining section determines at least one radio receiving apparatus located the farthest among said plurality of radio receiving apparatuses.

20. A base station apparatus comprising the radio transmission apparatus according to claim 1.

21. A radio transmission method in a radio transmission apparatus carrying out multicasting or broadcasting of common data for a plurality of radio receiving apparatuses, the radio transmission method comprising:
  acquiring per-subcarrier reception quality information from at least one of said plurality of radio receiving apparatuses;
  selecting a subcarrier, wherein the subcarrier is used for the multicasting or the broadcasting of said common data, and the subcarrier is selected among a plurality of subcarriers, each of which has a different frequency, based on the acquired per-subcarrier reception quality information; and
  controlling transmission power of the selected subcarrier.

* * * * *